US012785471B2

(12) United States Patent
Onizuka et al.

(10) Patent No.: US 12,785,471 B2
(45) Date of Patent: Nov. 3, 2026

(54) ROTARY MEMBER

(71) Applicants: NITTA CORPORATION, Osaka (JP); Honda Motor Co., Ltd., Tokyo (JP)

(72) Inventors: Maki Onizuka, Osaka (JP); Takuji Komukai, Osaka (JP); Kaoru Tomioka, Saitama (JP); Yuji Ono, Saitama (JP); Koji Ueda, Saitama (JP)

(73) Assignees: NITTA CORPORATION, Osaka (JP); Honda Motor Co., Ltd., Tokyo (JP)

( * ) Notice: Subject to any disclaimer, the term of this patent is extended or adjusted under 35 U.S.C. 154(b) by 135 days.

(21) Appl. No.: 18/975,120

(22) Filed: Dec. 10, 2024

(65) Prior Publication Data

US 2025/0246952 A1 Jul. 31, 2025

(30) Foreign Application Priority Data

Jan. 30, 2024 (JP) ................................ 2024-012330

(51) Int. Cl.
*H02K 1/27* (2022.01)

(52) U.S. Cl.
CPC ........... *H02K 1/27* (2013.01); *H02K 2213/03* (2013.01)

(58) Field of Classification Search
CPC ............................ H02K 1/27; H02K 2213/03
USPC .................................................... 310/156.28
See application file for complete search history.

(56) References Cited

U.S. PATENT DOCUMENTS

| | | | | |
|---|---|---|---|---|
| 4,433,261 A * | 2/1984 | Nashiki | H02K 1/278 310/156.28 |
| 6,047,461 A * | 4/2000 | Miura | H02K 21/12 310/156.28 |
| 6,920,682 B2 * | 7/2005 | Ku | H02K 33/16 310/156.28 |
| 11,863,026 B2 * | 1/2024 | Høyland | H02K 1/278 |
| 11,909,293 B2 * | 2/2024 | Høyland | H02K 1/2753 |
| 11,958,948 B2 * | 4/2024 | Komukai | C08J 5/005 |
| 2006/0022541 A1 * | 2/2006 | Ong | H02K 1/278 310/156.31 |
| 2015/0188369 A1 * | 7/2015 | Arimatsu | H02K 1/28 310/156.28 |

FOREIGN PATENT DOCUMENTS

JP 2003-319581 A 11/2003

* cited by examiner

*Primary Examiner* — Alexander Talpalatski
(74) *Attorney, Agent, or Firm* — Osha Bergman Watanabe & Burton LLP

(57) ABSTRACT

A rotary member is a carbon fiber-reinforced molded article in which a carbon fiber is embedded in a matrix resin, and is a rotary member that rotates integrally with a rotary body of an electric motor or a generator. The rotary member includes a helical layer in which a composite carbon fiber is oriented at an inclination angle in a range of 40° to 80° with respect to an axial direction of the rotary member, and a hoop layer in which the composite carbon fiber is oriented in a direction substantially orthogonal to the axial direction of the rotary member. The composite carbon fiber includes a structure that is provided on a surface of the carbon fiber, includes a plurality of carbon nanotubes having a bent shape and including a bent portion, and forms a network structure including a contact portion in which the carbon nanotubes are in direct contact with each other, and a sizing agent that cross-links the carbon nanotubes in direct contact with each other.

4 Claims, 12 Drawing Sheets

ROTARY MEMBER

CROSS REFERENCE TO RELATED APPLICATIONS

This application claims the benefit of foreign priority to Japanese Patent Application No. 2024-012330, filed on Jan. 30, 2024, which is incorporated by reference in its entirety.

TECHNICAL FIELD

The present invention relates to a rotary member.

BACKGROUND ART

As a rotary member that rotates at a high speed, for example, a rotary member that is fitted around a rotor of a surface magnet type electric motor or a generator having a structure similar to that of the surface magnet type electric motor (hereinafter, referred to as a "surface magnet type electric motor" or the like) is known (for example, refer to PTL 1). A plurality of permanent magnets are embedded in an outer circumferential surface of the rotor of the surface magnet type electric motor or the like, and the rotor is press-fitted into a hollow inside of the rotary member in order to prevent the permanent magnets from being peeled off and scattered from the rotor due to a centrifugal force. Since a force from the permanent magnets acts on the rotary member toward an outer side in a diameter direction, high tensile strength is required in a circumferential direction of the rotary member. In addition, a centrifugal force also acts on the mass of the rotary member. Therefore, as the rotary member, an article formed from a carbon fiber-reinforced plastic in which carbon fibers are set as a reinforcement fiber is also known.

CITATION LIST

Patent Literature

PTL 1: JP-A-2003-319581

SUMMARY OF INVENTION

Technical Problem

In the surface magnet type electric motor or the like as described above, a magnetic air gap of the rotary member is increased at least by a thickness of the rotary member, and the magnetic flux density is decreased by the increase in the magnetic air gap, thereby decreasing the efficiency. Therefore, the rotary member of the surface magnet type electric motor or the like is required to be thin and have sufficient strength as well as light weight. Although it is useful to use a rotary member formed from a carbon fiber-reinforced plastic as such a rotary member, a rotary member having a smaller thickness and a higher tensile strength is desired.

An object of the present invention is to provide a rotary member that is light in weight and has higher tensile strength.

Solution to Problem

A rotary member of the present invention is a carbon fiber-reinforced molded article in which a carbon fiber is embedded in a matrix resin, and is a rotary member that rotates integrally with a rotary body of an electric motor or a generator. The rotary member includes a helical layer in which a composite carbon fiber is oriented at an inclination angle in a range of 40° to 80° with respect to an axial direction of the rotary member, and a hoop layer in which the composite carbon fiber is oriented in a direction substantially orthogonal to the axial direction of the rotary member. The composite carbon fiber includes a structure that is provided on a surface of the carbon fiber, includes a plurality of carbon nanotubes having a bent shape and including a bent portion, and forms a network structure including a contact portion in which the carbon nanotubes are in direct contact with each other, and a sizing agent that cross-links the carbon nanotubes in direct contact with each other.

Advantageous Effects of Invention

According to the present invention, since the rotary member is a carbon fiber-reinforced molded article in which carbon fibers having a structure of carbon nanotubes formed on surfaces thereof are embedded in a matrix resin, and the rotary member includes a helical layer in which composite carbon fibers are oriented at a predetermined inclination angle with respect to the axial direction and a hoop layer, it is possible to provide a rotary member that is light in weight and has higher tensile strength.

DESCRIPTION OF EMBODIMENTS

Figure 1:
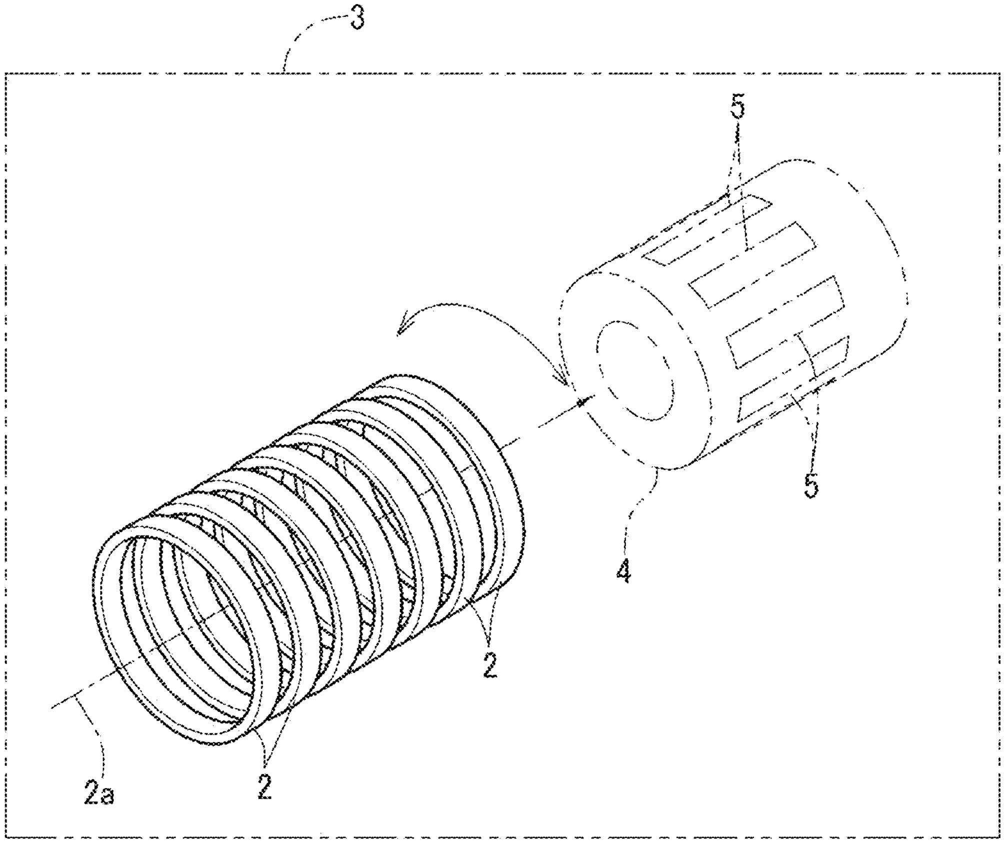
FIG. 1 is an explanatory diagram illustrating a configuration of main parts of a surface magnet type electric motor according to an embodiment.

FIG. 1 shows members 2 according to an embodiment. A plurality of rotary members 2 are provided as scattering prevention members for a surface magnet type electric motor 3. The rotary members 2 have a ring shape (cylindrical shape) with a small width (short in the direction of an axis 2*a* of the rotary members 2). The plurality of rotary members 2 are fitted around a rotor 4, which is a rotary body, so as to be disposed in an axial (central axis of rotation) direction of the rotor 4. Each of the rotary members 2 is a sleeve into whose hollow inside the rotor 4 is press-fitted and fixed, and rotates integrally with the rotor 4. Accordingly, the rotary member 2 rotates in a circumferential direction thereof. A plurality of permanent magnets 5 are embedded in an outer circumferential surface of the rotor 4 with predetermined intervals along a circumferential direction of the rotor 4. The rotary member 2 constrains the permanent magnets 5 against a centrifugal force so that the permanent magnets 5 are not peeled off and scattered to an outer side in a diameter direction of the rotor 4 due to the centrifugal force that acts on the permanent magnets 5 during high-speed rotation of the rotor 4.

Figure 2:
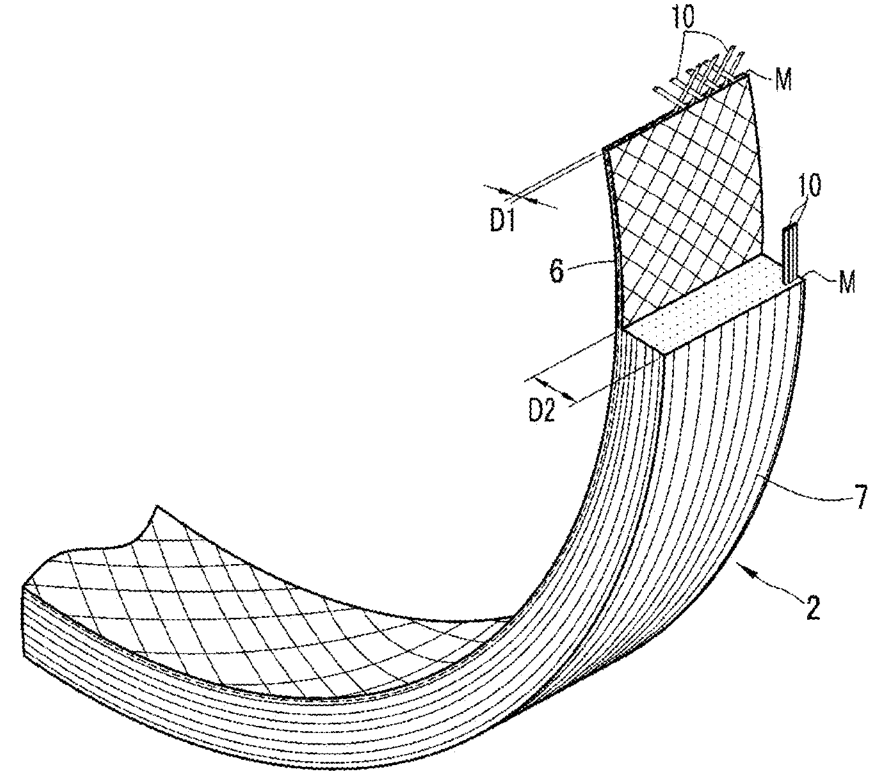
FIG. 2 is a partial cross-sectional view schematically illustrating a helical layer and a hoop layer in a rotary member.

As schematically illustrated in FIG. 2, the rotary member 2 is a carbon fiber-reinforced molded article (carbon fiber-reinforced plastic) including composite fiber bundles 10, and a matrix resin M in which carbon fibers 12 (refer to FIG. 5) of composite fibers 11 (refer to FIG. 5) constituting each of the composite fiber bundles 10 are embedded. The composite fiber bundle 10 is wound in a circumferential direction of the rotary member 2. The configuration "wound in a circumferential direction of the rotary member 2" represents that the composite fiber bundle 10 has a component along the circumferential direction of the rotary member 2. The rotary member 2 includes a helical layer 6 and a hoop layer 7 formed on an outer circumference of the helical layer 6. Note that, in FIG. 2, for convenience of explanation, each of the composite fiber bundles 10 is exaggerated and drawn so as to be distinguishable.

Figure 3:
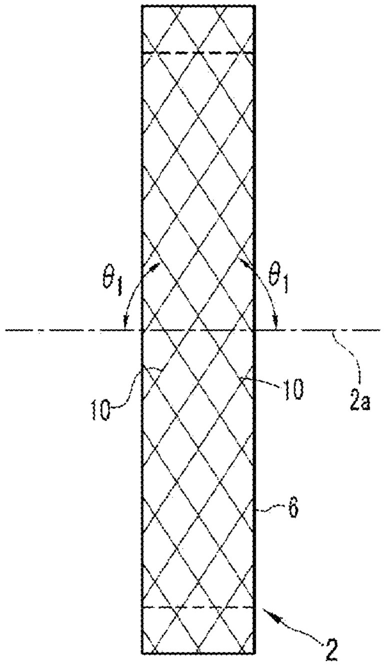
FIG. 3 is a partial cross-sectional view schematically illustrating the orientation of a composite fiber bundle in the helical layer.

The helical layer 6 is a layer in which the composite fiber bundles 10 are helically wound, increases the strength against a force in an axis direction of the rotary member 2, and prevents the hoop layer 7 from collapsing when the rotary member 2 is press-fitted into the rotor 4. As illustrated in FIG. 3, in the helical layer 6, when the rotary member 2 is viewed from a direction orthogonal to the axis 2*a*, the composite fiber bundles 10 are oriented to be inclined at an inclination angle $\theta_1$ with respect to the axis 2*a*, and the composite fiber bundles 10 include those oriented at the inclination angle $\theta_1$ in the clockwise direction with respect to the axis 2*a* and those oriented at the inclination angle $\theta_1$ in the counterclockwise direction. The inclination angle $\theta_1$ is the same as a winding angle when the rotary member 2 is manufactured. Here, the inclination angle $\theta_1$ of the helical winding is in a range of 40° to 80°. In this example, the inclination angle $\theta_1$ is 40°.

Hereinafter, regarding the helical layer 6, when the composite fiber bundles 10 inclined in the clockwise direction and the composite fiber bundles 10 inclined in the counterclockwise direction are distinguished from each other, the angles are denoted by positive and negative signs according to the direction of inclination with respect to the axis 2*a*. When the hoop layer 7 is similarly distinguished, the angles are denoted by positive and negative signs.

In the helical layer 6, if a layer including one layer of composite fiber bundles 10 wound (disposed) without gaps in the axis direction of the rotary member 2 with an inclination angle of $+\theta_1$ and one layer of composite fiber bundles 10 wound without gaps with an inclination angle of $-\theta_1$ is defined as a helical unit layer, the helical layer 6 includes one or more helical unit layers. The helical unit layer includes portions in which the composite fiber bundles 10 having the inclination angle $+\theta_1$ intersect the composite fiber bundles 10 having the inclination angle $-\theta_1$. When the helical layer 6 includes a plurality of helical unit layers, the helical unit layers are provided in a diameter direction of the rotary member 2. The smaller the inclination angle $\theta_1$, the smaller the contribution to the improvement in the strength against a force in the diameter direction or the circumferential direction.

Figure 4:
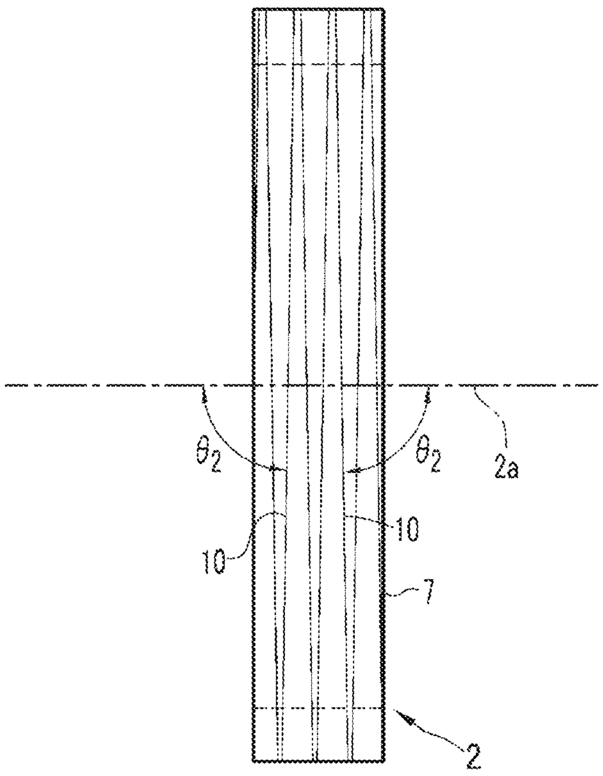
FIG. 4 is a partial cross-sectional view schematically illustrating the orientation of a composite fiber bundle in the hoop layer.

The hoop layer 7 is a layer in which the composite fiber bundles 10 are wound into a hoop, and the hoop layer 7 substantially provides the rotary member 2 with high strength in the diameter direction or the circumferential direction. As illustrated in FIG. 4, in the hoop layer 7, the composite fiber bundles 10 are oriented at an inclination angle $\theta_2$ substantially orthogonal to the axis 2*a* when the rotary member 2 is viewed from the direction orthogonal to the axis 2*a*. Here, "substantially orthogonal" means that the inclination angle $\theta_2$ is in a range of 85° to 90°. Strictly speaking, the composite fiber bundles 10 of the hoop layer 7 also include those oriented at the inclination angle $\theta_2$ in the clockwise direction and those oriented at the inclination angle $\theta_2$ in the counterclockwise direction with respect to the axis 2*a*.

In the hoop layer 7, if a layer including the composite fiber bundles 10 wound (disposed) without gaps in the axis direction of the rotary member 2 with the inclination angle $\theta_2$ is defined as a hoop unit layer, the hoop layer 7 includes two or more hoop unit layers. The hoop unit layer has no portions in which the composite fiber bundles 10 having different positive and negative inclination angles $\theta_2$ intersect. In the hoop layer 7, a hoop unit layer of the composite fiber bundles 10 oriented at an inclination angle +θ2 and a hoop unit layer of the composite fiber bundles 10 oriented at an angle $-\theta_2$ are alternately provided in the diameter direction of the rotary member 2.

A thickness D1 of the helical layer 6 is adjusted by increasing or decreasing the number of helical unit layers. Similarly, a thickness D2 of the hoop layer 7 is adjusted by increasing or decreasing the number of hoop unit layers. A thickness of the rotary member 2 is the sum of the thicknesses of the helical layer 6 and the hoop layer 7 (=D1+D2).

The rotary member 2 preferably has a thickness ratio (D2/D1) of the thickness D1 of the helical layer 6 to the thickness D2 of the hoop layer 7 in a range of 5 or more and 20 or less in order to obtain a higher strength against a force in the diameter direction or the circumferential direction while having a predetermined strength in the axial direction.

When the thickness ratio (D2/D1) is 5 or more, the required strength can be obtained while effectively reducing the thickness of the rotary member 2. When the thickness ratio (D2/D1) is 20 or less, the strength for fitting the rotary member 2 into the rotor 4 can be further increased, and the possibility of breakage can be sufficiently reduced.

If the thickness D1 of the helical layer 6 is a certain degree, the strength of the rotary member 2 necessary for press-fitting into the rotor 4 can be obtained, and if the thickness D2 of the hoop layer 7 is a certain degree or more, the hoop layer 7 is crushed to increase an inner diameter of the rotary member 2, which facilitates the press-fitting. Therefore, an upper limit of the thickness D1 of the helical layer 6 is preferably 600 μm, and more preferably 350 μm. That is, when the thickness D1 of the helical layer 6 based on the above-described thickness ratio to the thickness D2 of the hoop layer 7 exceeds the upper limit, the thickness D1 is preferably set to the upper limit.

The thickness of the rotary member 2 in this example is 1.83 mm, and the thickness ratio is 5.1. That is, the thickness D1 of the helical layer 6 is 0.3 mm, and the thickness D2 of the hoop layer 7 is 1.53 mm.

[Composite Fiber Bundle]

Figure 5:
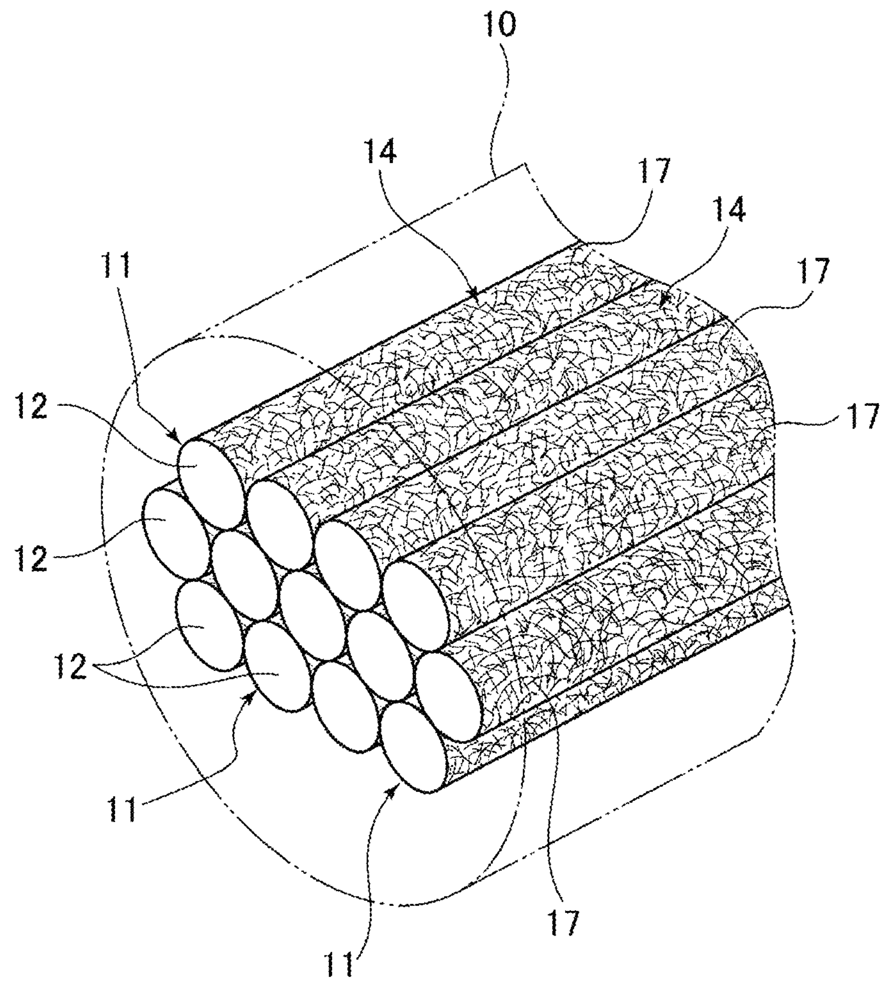
FIG. 5 is an explanatory diagram illustrating a configuration of the composite fiber bundle.

In FIG. 5, the composite fiber bundle 10 is a bundle of a plurality of composite fibers 11. Each of the composite fibers 11 includes a carbon fiber 12 and a structure 14 formed on a surface of the carbon fiber 12, and a sizing agent 15 (see FIG. 6) is applied to the structure 14. In the structure 14, a plurality of carbon nanotubes (hereinafter, referred to as "CNTs") 17 are entangled. Note that, in FIG. 5, only a dozen pieces of the composite fibers 11 are drawn for convenience of explanation.

The composite fiber bundle 10 is constituted by, for example, 12K composite fibers 11, that is, 12000 composite fibers 11. The number of the composite fibers 11 which constitute the composite fiber bundle 10 is not particularly limited, and may be set, for example, within a range of 10000 to 100000. In the composite fiber bundle 10, it is preferable that the composite fibers 11 are not substantially entangled with each other, and a fiber axis direction of each of the composite fibers 11 is aligned. The fiber axis direction is a direction (extension direction) of an axis of the composite fiber 11 or the carbon fiber 12.

In a carbon fiber bundle 18 (see FIG. 11) in which the carbon fibers 12, which are raw fibers used when the composite fiber bundle 10 is manufactured, are bundled together, it is preferable that the carbon fibers 12 are not substantially entangled with each other, and a fiber axis direction of each of the carbon fibers 12 is aligned. In the carbon fiber bundle 18 in which the carbon fibers 12 are not substantially entangled with each other, or are less entangled with each other, the carbon fibers 12 are likely to be uniformly spread. According to this, it is easy to cause a CNT 17 to uniformly adhere to the carbon fiber 12 as a raw fiber. In addition, in the composite fiber bundle 10, the matrix resin M is uniformly impregnated into the composite fiber bundle 10, and each of the composite fibers 11 can contribute to the strength.

Entanglement of the carbon fibers 12 in the carbon fiber bundle can be evaluated with the degree of disturbance of the carbon fibers 12. For example, the carbon fiber bundle is observed with a scanning electron microscope (SEM) at a constant magnification, and lengths of a predetermined number of (for example, 10) carbon n fibers 12 in an observation range (a predetermined length range of the carbon fiber bundle) are measured. The degree of disturbance of the carbon fibers 12 can be evaluated on the basis of a variation, a difference between a maximum value and a minimum value, and a standard deviation of the lengths which are obtained from the measurement results and relate to the predetermined number of carbon fibers 12. In addition, it can be determined that the carbon fibers 12 are not substantially entangled by measuring the degree of entanglement, for example, in conformity to a method for measuring the degree of entanglement in JIS L1013:2010 "Testing methods for man-made filament yarns". The smaller the measured degree of entanglement is, the less the carbon fibers 12 are entangled with each other in the carbon fiber bundle. Entanglement of the composite fibers 11 in the composite fiber bundle 10 can also be evaluated in the same manner.

As the carbon fibers 12, a PAN-based or pitch-based fiber obtained by baking an organic fiber such as polyacrylic nitrile, rayon, and pitch which are derived from petroleum, coal, and coal tar, a fiber obtained by baking an organic fiber derived from wood or a plant fiber, and the like can be used without particular limitation, and the carbon fibers 12 may be commercially available carbon fibers. In addition, with regard to a diameter and a length of the carbon fibers 12, there is no particular limitation. As the carbon fibers 12, a fiber having a diameter in a range of approximately 5 μm to 20 μm can be preferably used, and a fiber having a diameter in a range of approximately 5 μm to 10 μm can be more preferably used. As the carbon fibers 12, a long fiber can be preferably used, and a length thereof is preferably 50 m or more, more preferably in a range of 100 m to 100000 m, and still more preferably in a range of 100 m to 10000 m. Note that, when the rotary member 2 is formed, the carbon fibers 12 may be cut short.

As described above, the structure 14 is formed on the surface of each of the carbon fibers 12. In the structure 14, a plurality of CNTs 17 are entangled. The CNTs 17 which constitute the structure 14 are uniformly dispersed and entangled across substantially the entire surface of each of the carbon fibers 12, and form a network structure in which the plurality of CNTs 17 are connected in a state of being entangled with each other. The connection stated here includes physical connection (simple contact) and chemical connection. The CNTs 17 come into direct contact with each other without intervening materials such as a dispersing agent including a surfactant, and adhesive therebetween.

Some of the CNTs 17 which constitute the structure 14 directly adhere and are fixed to the surfaces of the carbon fibers 12. According to this, the structure 14 directly adheres to the surfaces of the carbon fibers 12. A structure in which the CNTs 17 directly adhere to the surfaces of the carbon fibers 12 represents that the CNTs 17 directly adhere to the carbon fibers 12 in a state in which a dispersing agent such as a surfactant, adhesive, or the like is not interposed between the CNTs 17 and the surfaces of the carbon fibers 12. Since some of the CNTs 17 which constitute the structure 14 directly adhere to the surfaces of the carbon fibers 12, it enters a direct contact state in which the structure 14 comes into direct contact with the surfaces of the carbon fibers 12 without interposing the dispersing agent, the adhesive, or the like.

In addition, some of the CNTs 17 which constitute the structure 14 are entangled with other CNTs 17 and are fixed to the carbon fibers 12 without direct contact c with the surfaces of the carbon fibers 12. In addition, some of the CNTs 17 directly adhere to the surfaces of the carbon fibers 12 and are entangled with other CNTs 17 to be fixed to the carbon fibers 12. In the following description, fixing of the CNTs 17 to the carbon fibers 12 is collectively referred to as adhesion to the carbon fibers 12. Note that, a state in which the CNTs 17 are entangled or intertwined includes a state in which some of the CNTs 17 are pressed against other CNTs 17. The adhesion (fixing) between the CNTs 17 or between the CNTs 17 and the carbon fibers 12 is obtained due to bonding by van der Waals force, hydrogen bonding, or the like.

In addition to direct adhesion with the surfaces of the carbon fibers 12 as described above, some of the CNTs 17 which constitute the structure 14 are not in direct contact with the surfaces of the carbon fibers 12 but are fixed to the carbon fibers 12 by entanglement with other CNTs 17, or the like. Accordingly, the structure 14 of this example includes more CNTs 17 than a structure in which the CNTs directly adhere to surfaces of carbon fibers as in a structure of composite fibers of the related art. That is, the number of the CNTs 17 which adhere to the carbon fibers 12 further increases in comparison to the related art.

As described above, the plurality of CNTs 17 are connected to each other without intervening materials between surfaces, thereby constituting the structure 14. Accordingly, the composite fibers 11 exhibit performance of electric conductivity and thermal conductivity derived from the CNTs. In addition, since the CNTs 17 adhere to the surfaces of the carbon fibers 12 without intervening materials, the CNTs 17 constituting the structure 14 are less likely to be peeled off from the surfaces of the carbon fibers 12, and in the rotary member 2 including the composite fibers 11, mechanical strength including tensile strength is improved.

As described above, in the rotary member 2, the composite fiber bundle 10 constituted by the plurality of composite fibers 11 on which the structure 14 is formed is impregnated with the matrix resin M, and the matrix resin M is cured therein. Since the structure 14 is impregnated with the matrix resin M and the matrix resin M is cured therein as described above, the structure 14 of each of the carbon fibers 12 is fixed to the surface of the carbon fiber 12 and the matrix resin M. This results in a state in which the carbon fiber 12 of each of the composite fibers 11 is strongly bonded to the matrix resin M, that is, interface adhesion strength between the carbon fiber 12 and the matrix resin M is high, and tensile strength of the rotary member 2 is high.

Since the CNTs 17 are set to have a bent shape as to be described later, in comparison to a case of using CNTs with high linearity, the number of CNTs 17 adhered to the carbon fibers 12 further increases, a thickness of the structure 14 is larger, and the structure 14 has a configuration in which the CNTs 17 are knitted like a non-woven fabric fiber. A region (hereinafter, referred to as a "composite region") 19 in which the structure 14 is impregnated with the matrix resin M and the matrix resin M is cured is formed at a periphery of each of the carbon fibers 12 of the rotary member 2 (refer to FIG. 15). By forming such a composite region 19, interface adhesion strength between the carbon fibers 12 and the matrix resin M is further raised, and the tensile strength of the rotary member 2 becomes higher. In addition, by interposition of the CNT 17 in a resin portion between adjacent carbon fibers 12, an interaction between carbon fibers becomes stronger and a decrease in strength caused by defects existing in the carbon fibers 12 is supported by other adjacent carbon fibers 12, thereby the decrease in strength caused by the defects is suppressed.

Note that, examples of properties of the carbon fiber-reinforced molded article (the rotary member 2) which are improved by adhering the CNT 17 on the surfaces of the carbon fibers 12 and forming the structure 14 having the large thickness and the non-woven fabric shape include elastic modulus, vibration damping properties (damping properties), durability against repetitive bending, and the like in addition to the tensile strength.

The structure 14 that is formed on each of the plurality of carbon fibers 12 has an independent structure, and the structure 14 of one of the carbon fibers 12 does not share the same CNT 17 with the structure 14 of another carbon fiber 12. That is, the CNTs 17 contained in the structure 14 provided in the one carbon fiber 12 is not contained in the structure 14 provided in the other carbon fiber 12.

Figure 6:
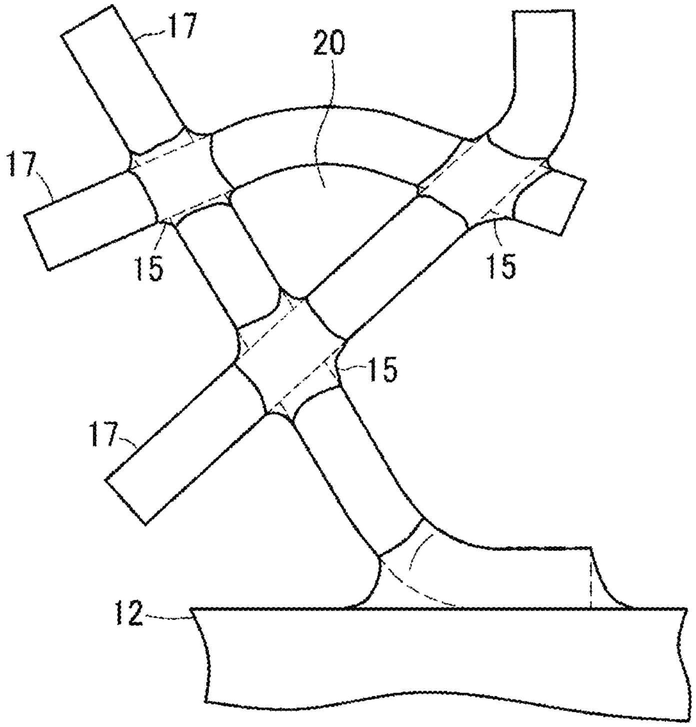
FIG. 6 is an explanatory diagram illustrating an adhesion state of a sizing agent to CNTs.
Figure 7:
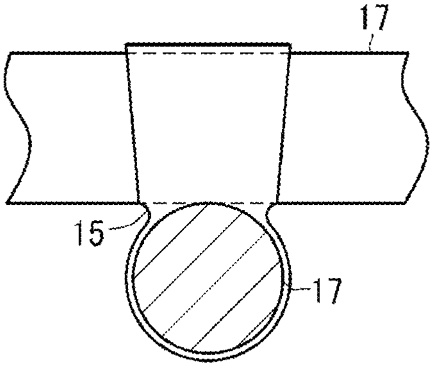
FIG. 7 is an explanatory diagram illustrating an adhesion state of the sizing agent in a contact portion in which the CNTs are in contact with each other.

As illustrated in FIG. 6, the sizing agent 15 is applied to the CNTs 17 in a state of wrapping and covering a contact portion at which the CNTs 17 are in direct contact with each other. The sizing agent 15 fixes the CNTs 17 at the contact portion at which the CNTs 17 are in direct contact with each other. The CNTs 17 in the contact portion are fixed by the sizing agent 15 in a state in which the CNTs 17 are maintained in direct contact with each other as illustrated in FIG. 7.

As the sizing agent 15, a thermosetting resin, a cured product of a reactive resin having a structure generated by reacting with a functional group present on surfaces of the CNTs 17, or the like is preferably used. The reactive resin is a resin having a highly reactive functional group. Examples of the reactive resin include an isocyanate compound that forms the sizing agent 15 having a structure derived from isocyanate generated by reaction of an isocyanate group, and a carbodiimide compound that forms the sizing agent 15 having a structure derived from carbodiimide generated by reaction of a carbodiimide group. Note that, when a reactive resin is used, a method for applying the functional group on the surfaces of the CNTs 17 is not particularly limited, and the functional group may be applied as a result of various treatments performed after manufacturing the CNTs 17, or may be applied by a functional group application treatment.

As described above, the sizing agent 15 fixes the CNTs 17 which constitute the structure 14 and are in contact with each other. Accordingly, the adhesion state of the CNTs 17 becomes stronger, and the structure 14 is less likely to collapse.

In addition, as illustrated in FIG. 6, the sizing agent 15 adheres to the carbon fibers 12 and the CNTs 17 in a state of wrapping and covering a contact portion of the CNTs 17 in direct contact with the carbon fibers 12. The sizing agent 15 fixes the carbon fibers 12 and the CNTs 17 as in the case of the CNTs 17. As described above, the sizing agent 15 fixes the carbon fibers 12 and the CNTs 17. Accordingly, the adhesion state of the CNTs 17 to the carbon fibers 12 becomes stronger, and the structure 14 is less likely to be peeled off from the carbon fibers 12.

By the sizing agent 15, when manufacturing the composite fiber bundle 10 or the rotary member 2, detachment of the structure 14 from the carbon fibers 12 and detachment of the CNTs 17 from the structure 14 can be suppressed, and thus it is possible to prevent a decrease in the interface adhesion strength, and a deterioration of properties including the tensile strength of the rotary member 2, and it is possible to obtain uniform preferred properties.

Figure 8:
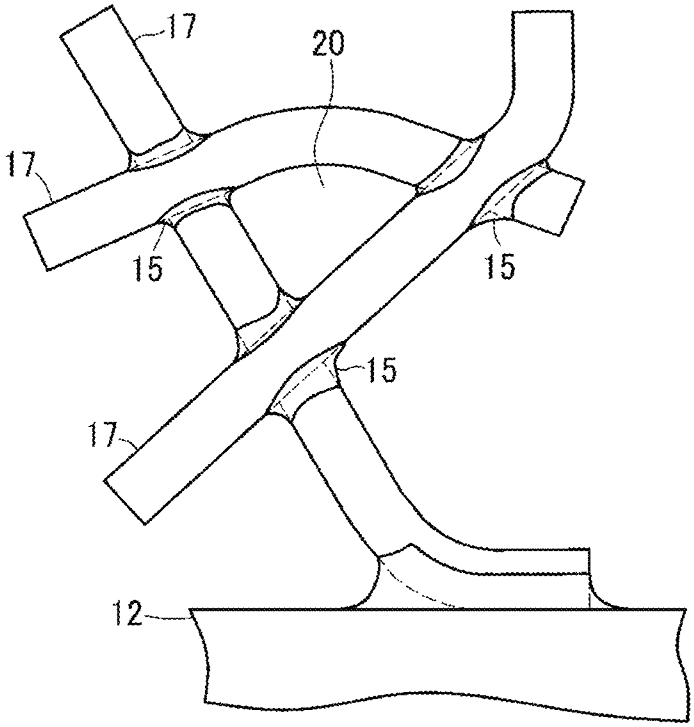
FIG. 8 is an explanatory diagram illustrating another adhesion state of the sizing agent to the CNTs.
Figure 9:
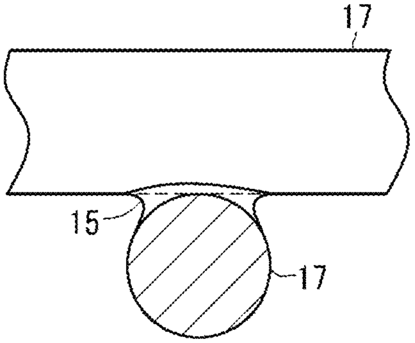
FIG. 9 is an explanatory diagram illustrating another adhesion state of the sizing agent in the contact portion in which the CNTs are in contact with each other.

Note that, when direct contact of the CNTs 17 is maintained, and the CNTs 17 are fixed around a contact portion at which the CNTs 17 are in direct contact with each other by the sizing agent 15, the CNTs 17 may be wrapped and covered with the sizing agent 15 as described above, or may not be wrapped and covered as illustrated in FIG. 8 and FIG. 9. Similarly, when the direct contact between the carbon fibers 12 and the CNTs 17 is maintained, the carbon fibers 12 and the CNTs 17 are fixed around the contact portion at which the carbon fibers 12 and the CNTs 17 are in direct contact with each other by the sizing agent 15, as illustrated in FIG. 8, the sizing agent 15 may not wrap and cover the CNTs 17.

Note that, in the structure 14, a gap (mesh) 20 surrounded by the plurality of CNTs 17 is formed by the CNTs 17. It is preferable that the sizing agent 15 does not fill up the gap 20 so as not to block impregnation with the matrix resin M into the structure 14.

The CNTs 17 adhered to the carbon fibers 12 have a bent shape. The bent shape of the CNTs 17 is obtained because a bent portion is provided due to existence of a five-membered ring, a seven-membered ring, and the like of carbon in a graphite structure of the CNTs 17. The bent shape is a shape from which the CNTs 17 can be evaluated to be curved, bent, or the like from observation with an SEM. For example, the bent shape of the CNTs 17 represents that the bent portion exists at least at one site or more per an average length of a use range of the CNTs 17 to be described later. Even in a case where the CNTs 17 are long, the CNTs 17 having a bent shape adhere to the surfaces of the carbon fibers 12 which are curved surfaces in various postures. In addition, the CNTs 17 having a bent shape are likely to form a space (gap) between the surfaces of the carbon fibers 12 to which the CNTs 17 adhere, or between the adhered CNTs 17, and another CNT 17 enters the space. Therefore, when using the CNTs 17 having a bent shape, the number of the CNTs 17 adhered to the carbon fibers 12 (the number of the CNTs 17 forming the structure 14) further increases in comparison to the case of using CNTs having a shape with high linearity.

A length of the CNTs 17 is preferably within a range of 0.1 μm to 10 μm. When the length is 0.1 μm or more, the CNTs 17 can more reliably form the structure 14 in which the CNTs 17 are entangled and come into direct contact with each other or are directly connected to each other, and it is possible to more reliably form the space which the other CNT 17 enters as described above. In addition, when the length of the CNTs 17 is 10 μm or less, the CNTs 17 do not adhere between the carbon fibers 12. That is, as described above, a CNT 17 that is contained in the structure 14 provided in one carbon fiber 12 is not contained in the structure 14 provided in another carbon fiber 12.

The length of the CNTs 17 is more preferably within a range of 0.2 μm to 5 μm. When the length of the CNTs 17 is 0.2 μm or more, the number of the CNTs 17 adhered increases and the structure 14 can be made thick. When the length is 5 μm or less, when causing the CNTs 17 to adhere to the carbon fibers 12, the CNTs 17 are less likely to aggregate, and the CNTs 17 are likely to be more evenly dispersed. As a result, the CNTs 17 more evenly adhere to the carbon fibers 12.

Note that, with regard to the CNTs adhered to the carbon fibers 12, mixing-in of CNTs with high linearity or mixing-in of CNTs having a length out of the above-described range are not excluded. For example, even in a case where mixing-in occurs, since the CNTs with high linearity enter a space formed by the CNTs 17, it is possible to increase the number of the CNTs adhered to the carbon fibers 12.

It is preferable that an average diameter of the CNTs 17 is within a range of 0.5 nm to 30 nm, and more preferably a range of 3 nm to 10 nm. When the diameter is 30 nm or less, the CNTs 17 are very flexible and are likely to adhere to the carbon fibers 12 along the surfaces thereof, and are likely to be fixed to the carbon fibers 12 in a state of being entangled with other CNTs 17. In addition to this, formation of the structure 14 becomes more reliable. In addition, when the diameter is 10 nm or less, bonding between the CNTs 17 constituting the structure 14 becomes strong. Note that, the diameter of the CNTs 17 is set as a value measured by using a transmission electron microscope (TEM) photograph. The CNTs 17 may be a single-layer structure or a multi-layer structure, but the multi-layer structure is preferable.

The number of the CNTs 17 adhered to the carbon fibers 12 can be evaluated with the thickness of the structure 14 (a length in a diameter direction of the carbon fibers 12). For example, the thickness of each portion of the structure 14 can be measured as follows. Specifically, a part of the structure 14 on the surfaces of the carbon fibers 12 is bonded to a cellophane tape or the like and is peeled off, and a cross section of the structure 14 remaining on the surfaces of the carbon fibers 12 is measured with an SEM or the like to acquire the thickness. In order to almost uniformly cover a measurement range of a predetermined length along a fiber axis direction of the carbon fibers 12, the thickness of the structure 14 is measured at ten sites in the measurement range, and an average of the measured values is set as the thickness of the structure 14. For example, the length of the measurement range is set to a length that is five times an upper limit of a range of the length of the CNTs 17 described above.

The thickness (average) of the structure 14 which is obtained as described above is preferably within a range of 10 nm to 300 nm, more preferably within a range of 15 nm to 200 nm, and still more preferably within a range of 50 nm to 200 nm. When the thickness of the structure 14 is 200 nm or less, an impregnation property with a resin between the carbon fibers 12 is satisfactory.

A thermosetting resin having high heat resistance can be used as the matrix resin M. Examples of the thermosetting resin used for the matrix resin M include an epoxy resin, a phenol resin, a melamine resin, a urea resin, thermosetting polyimide, a cyanate ester resin, a bismaleimide resin, a vinyl ester resin, and mixtures thereof.

Figure 10:
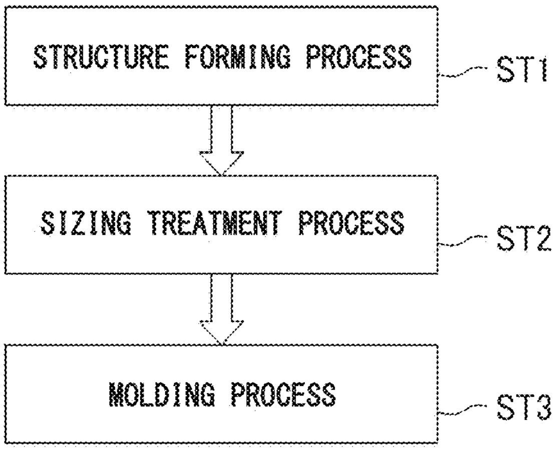
FIG. 10 is an explanatory diagram showing an overview of a procedure of manufacturing the rotary member.

Next, a procedure of manufacturing the rotary member 2 will be described. As shown in FIG. 10, the rotary member 2 is manufactured through a structure forming process ST1, a sizing treatment process ST2, and a molding process ST3. In the structure forming process ST1, the CNTs 17 are caused to adhere to each of the carbon fibers 12 (raw fiber) of the carbon fiber bundle 18, thereby forming the structure 14. For this, the carbon fiber bundle 18 is immersed in a CNT isolated dispersion (hereinafter, simply referred to as "dispersion") in which the CNTs 17 are isolated and dispersed, and mechanical energy is applied to the dispersion. The term "isolated and dispersed" represents a state in which the CNTs 17 are physically separated one by one and are dispersed in a dispersion medium without entanglement, and a state in which a ratio of an aggregate in which two or more CNTs 17 are aggregated in a bundle form is 10% or less. Here, when the ratio of the aggregate is 10% or more, aggregation of the CNTs 17 in the dispersion medium is promoted, and adhesion of the CNTs 17 to the carbon fibers 12 is inhibited.

Figure 11:
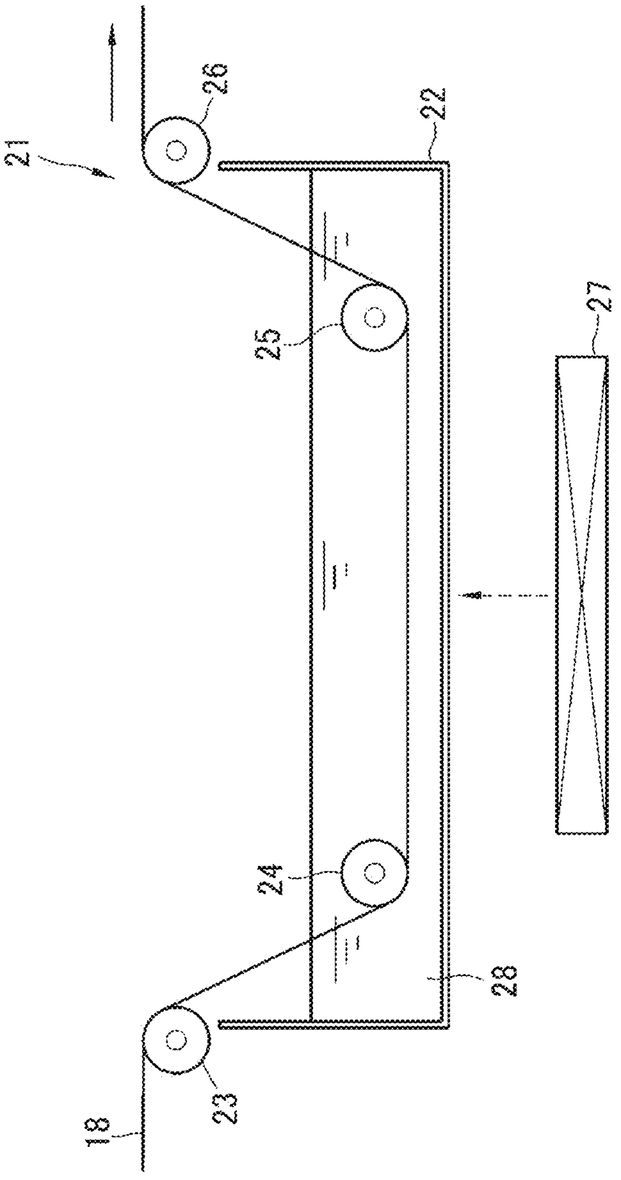
FIG. 11 is an explanatory diagram illustrating a configuration of an adhesion device that causes the CNTs to adhere to a carbon fiber.

As illustrated in an example in FIG. 11, an adhesion device 21 includes a CNT adhesion tank 22, guide rollers 23 to 26, an ultrasonic wave generator 27, a traveling mechanism (not illustrated) that causes the carbon fiber bundle 18 to travel at a constant speed, and the like. A dispersion 28 is stored in the CNT adhesion tank 22. The ultrasonic wave generator 27 applies ultrasonic waves to the dispersion 28 in the CNT adhesion tank 22 from a lower side of the CNT adhesion tank 22.

The carbon fiber bundle 18 having a long length (for example, approximately 100 m) in which the structure 14 is not formed is continuously supplied to the adhesion device 21. The carbon fiber bundle 18 that is supplied is wound around the guide rollers 23 to 26 in this order, and travels at a constant speed by the traveling mechanism. The carbon fiber bundle 18 in which a sizing agent for preventing entanglement does not adhere to the carbon fibers 12 is supplied to the adhesion device 21. The sizing agent for preventing entanglement stated here prevents the carbon fibers 12 from being entangled or the like, and is different from the sizing agent 15 described above.

The carbon fiber bundle 18 is wound around the guide rollers 23 to 26 including, for example, flat rollers in a spread state. Appropriate tension acts on the carbon fiber bundle 18 wound around the guide rollers 23 to 26, and thus the carbon fibers 12 are less likely to be entangled with each other. It is preferable that the winding of the carbon fiber bundle 18 around the guide rollers 23 to 26 is set to a smaller winding angle (90° or less).

Among the guide rollers 23 to 26, the guide rollers 24 and 25 are disposed in the CNT adhesion tank 22. According to this, the carbon fiber bundle 18 travels between the guide rollers 24 and 25 in the dispersion 28. A traveling speed of the carbon fiber bundle 18 is preferably set within a range of 0.5 m/minute to 100 m/minute. The higher the traveling speed of the carbon fiber bundle 18 is, the further productivity is improved. The lower the traveling speed is, the more effective for uniform adhesion of the CNTs 17, and more effective for suppression of entanglement of the carbon fibers 12. In addition, the less entanglement between the carbon fibers 12 is, the further uniformity of adhesion of the CNTs 17 to the carbon fibers 12 is raised. When the traveling speed of the carbon fiber bundle 18 is 100 m/minute or less, entanglement between the carbon fibers 12 is more effectively suppressed, and adhesion uniformity of the CNTs 17 can be further raised. In addition, the traveling speed of the carbon fiber bundle 18 is more preferably set within a range of 5 m/minute to 50 m/minute.

The ultrasonic wave generator 27 applies ultrasonic vibration as mechanical energy to the dispersion 28. According to this, in the dispersion 28, a reversible reaction state in which a dispersion state in which the CNTs 17 are dispersed and an aggregation state in which the CNTs 17 are aggregated vary alternately id formed. When the carbon fiber bundle 18 is caused to pass through the dispersion 28 that is in the reversible reaction state, when transitioning from the dispersion state to the aggregation state, the CNTs 17 adhere to the carbon fibers 12 due to van der Waals force. A mass of the carbon fibers 12 is as large as 100000 or more times a mass of the CNTs 17, energy necessary for detachment of the adhered CNTs 17 is more than energy due to the ultrasonic vibration. Therefore, the CNTs 17 adhered once to the carbon fibers 12 in the dispersion 28 are not peeled off from the carbon fibers 12 by the ultrasonic vibration after adhesion. Note that, since the mass is very small, the dispersion state and the aggregation state alternately vary between the CNTs 17 due to the ultrasonic vibration.

When transition from the dispersion state to the aggregation state is repetitively performed, a large number of CNTs 17 adhere to each of the carbon fibers 12, and the structure 14 is formed. As described above, when using the CNTs 17 having a bent shape, other CNTs 17 enter a space formed between the CNTs 17 and the surfaces of the carbon fibers 12 to which the CNTs 17 adhere, between the adhered CNTs 17, or the like, and thus more CNTs 17 adhere to the carbon fibers 12 and the structure 14 is formed.

A frequency of the ultrasonic vibration applied to the dispersion 28 is preferably 40 kHz to 950 kHz. When the frequency is 40 KHz or more, entanglement between the carbon fibers 12 in the carbon fiber bundle 18 is suppressed. In addition, when the frequency is 950 kHz or less, the CNTs 17 adhere to the carbon fibers 12 in a satisfactory manner. In order to further reduce entanglement of the carbon fibers 12, the frequency of the ultrasonic vibration is preferably 100 kHz or more.

In addition, with regard to the number of the CNTs 17 adhered to the carbon fibers 12, when the number of times of transition from the dispersion state to the aggregation state in the CNTs 17 reaches 100000 or more times, entanglement of the carbon fibers 12 is satisfactorily suppressed, and uniformity of the thickness of the structure 14 can be secured. Note that, a maximum value of the number of the CNTs 17 adhered varies in accordance with a CNT concentration of the dispersion 28, and increases as the CNT concentration of the dispersion 28 is higher. However, when the CNT concentration of the dispersion 28 becomes a high concentration at which the CNTs 17 cannot take a dispersion state when applying the ultrasonic vibration, adhesion of the CNTs 17 to the carbon fibers 12 cannot be performed.

Therefore, it is preferable to determine the traveling speed of the carbon fiber bundle 18, a traveling distance of the carbon fiber bundle 18 in the dispersion 28 (an interval between the guide rollers 24 and 25), and the frequency of the ultrasonic vibration that is applied to the dispersion 28 so that the length of a period during which the carbon fiber bundle 18 is traveling in the dispersion 28, that is, time (hereinafter, referred to as "immersion time") for which the carbon fiber bundle 18 is traveling between the guide rollers 24 and 25 becomes 100000 or more times a cycle of the ultrasonic vibration applied to the dispersion 28. That is, it is preferable to satisfy "$Ts \geq 100000/fs$", where fs (Hz) represents the frequency of the ultrasonic vibration, and Ts (second) represents the immersion time. For example, when the frequency of the ultrasonic vibration is 100 kHz and the distance along which the carbon fiber bundle 18 travels in the dispersion 28 is 0.1 m, the traveling speed of the carbon fiber bundle 18 can be set to 6 m/minute or less. In addition, even in a case where the carbon fiber bundle 18 is immersed in the dispersion 28 in a plurality of times in a division manner, when total immersion time is set to 100000 or more times the cycle of the ultrasonic vibration, the number of the CNTs 17 adhered can be almost the maximum.

For example, the dispersion 28 is prepared as follows. A long CNT (hereinafter, referred to as "material CNT") is added to a dispersion medium, the material CNT is cut by a homogenizer, a shear force, an ultrasonic disperse, or the like to obtain the CNTs 17 having a desired length, and to realize dispersion uniformity of the CNTs 17.

As the dispersion medium, water, alcohols such as ethanol, methanol and isopropyl alcohol, organic solvents such as toluene, acetone, tetrahydrofuran (THF), methyl ethyl ketone (MEK), hexane, normal hexane, ethyl ether, xylene, methyl acetate, and ethyl acetate, and a mixed solution containing these materials in any ratios can be used. The dispersion 28 does not contain a dispersing agent and adhesive.

The material CNT that becomes a source of the CNTs 17 having a bent shape as described above also has a bent shape. In the material CNT, it is preferable that diameters of individual material CNTs are arranged. With regard to the material CNT, even when a length of each CNT generated from cutting is long, it is preferable that the CNT can be isolated and dispersed. According to this, the dispersion 28 in which the CNTs 17 satisfying the above-described length condition are isolated and dispersed is easily obtained.

In the composite fiber bundle 10 in this example, as described above, since CNTs having a bent shape are caused to adhere as the CNTs 17, other CNT 17 enters a space formed between the CNTs 17 and the surfaces of the carbon fibers 12 to which the CNTs 17 adhere, between the adhered CNTs 17, or the like. According to this, more CNTs 17 adhere to the carbon fibers 12. In addition, the CNTs 17 strongly adhere to the carbon fibers 12 and the structure 14 is formed, and thus the CNTs 17 are less likely to be peeled off from the carbon fibers 12. In addition, in the rotary member 2 manufactured by using the composite fiber bundle 10, the properties derived from the CNTs 17 are further enhanced.

A concentration of the CNTs 17 in the dispersion 28 is preferably in a range of 0.003 wt % to 3 wt %. The concentration of the CNTs 17 in the dispersion 28 is more preferably 0.005 wt % to 0.5 wt %.

The carbon fiber bundle 18 in which the CNTs 17 adhere to the carbon fibers 12 is dried after being pulled out from the dispersion 28. A sizing treatment is performed on the dried carbon fiber bundle 18 (hereinafter, referred to as a "CNT-adhered fiber bundle") to apply the sizing agent 15 to the structure 14.

In the sizing treatment process ST2, the sizing treatment is performed on the CNT-adhered fiber bundle. The sizing treatment includes a process of applying a sizing treatment solution to (bringing the sizing treatment solution into contact with) the CNT-adhered fiber bundle, and a drying process. The sizing treatment solution can be prepared by dissolving a resin to be the sizing agent 15 in a solvent. As the solvent, water, alcohol, ketones, mixtures thereof, and the like can be used depending on the resin.

In the application of the sizing treatment solution, any method such as a method of immersing the CNT-adhered fiber bundle in a liquid tank accommodating the sizing treatment solution, a method of spraying the sizing treatment solution to the CNT-adhered fiber bundle, and a method of coating the sizing treatment solution to the CNT-adhered fiber bundle may be used. The sizing treatment solution enters a state of being applied to the surface of the CNTs 17 in a state of maintaining direct contact between the CNTs 17. The lower the viscosity of the sizing treatment solution, the easier it is to aggregate in the vicinity of a contact portion between the CNTs 17 and in the vicinity of a contact portion between the carbon fibers 12 and the CNTs 17. By adjusting the amount of the sizing treatment solution applied to the CNT-adhered fiber bundle, a concentration of a resin serving as the sizing agent 15 in the sizing treatment solution, or the like, it is possible to prevent the gap 20 of the structure 14 from being blocked.

The CNT-adhered fiber bundle to which the sizing treatment solution is applied is dried to obtain the composite fiber bundle 10. In the drying after application of the sizing treatment solution, the solvent of the sizing treatment solution is caused to evaporate. As a drying method, a known method such as a method in which the CNT-adhered fiber bundle to which the sizing treatment solution is applied is left as is and dried, a method of blowing a gas such as the air to the CNT-adhered fiber bundle, and a method of heating the CNT-adhered fiber bundle can be used, and heating may be used in combination with any of the method of drying the CNT-adhered fiber bundle while being left as is and the method of blowing the gas.

Figure 12:
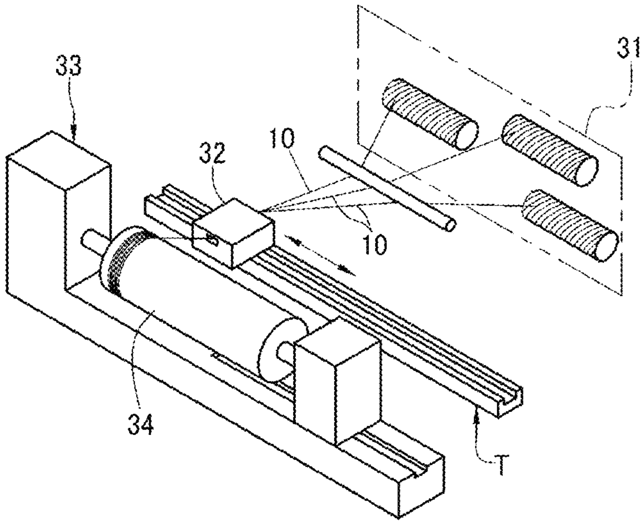
FIG. 12 is a perspective view illustrating an example of a filament winder.

In the molding process ST3, the rotary member 2 is formed by a filament winding method by using the composite fiber bundle 10 that has undergone the sizing treatment process ST2. As illustrated in an example in FIG. 12, for example, a plurality of the composite fiber bundles 10 are delivered from a creel (a yarn feeder) 31 while being adjusted to a predetermined tension, and the delivered composite fiber bundles 10 are fed to a filament winder 33 through a resin application device 32. When the composite fiber bundles 10 pass the resin application device 32, an uncured liquid matrix resin M is applied to the composite carbon fibers. By applying the matrix resin M by the resin application device 32, the structure 14 formed on the surfaces of the carbon fibers 12 are impregnated with the matrix resin M.

A mandrel 34 is set to the filament winder 33 in a rotatable manner. When the mandrel 34 is rotated by the filament winder 33, the composite fiber bundles 10 to which the matrix resin M is applied are wound around the mandrel 34 while a predetermined tension is applied to the composite fiber bundles 10. A winding position of the composite fiber bundles 10 around the mandrel 34 is determined by a head (not illustrated) provided in the resin application device 32. A traverse mechanism T reciprocates the resin application device 32 in an axis direction of the mandrel 34 in synchronization with the rotation of the mandrel 34. According to this, the composite fiber bundles 10 are wound while shifting the winding position of the composite fiber bundles 10 around the mandrel 34 in the axis direction of the mandrel 34.

First, a winding angle, which is an angle of the composite fiber bundles 10 with respect to the axis direction of the mandrel 34, is set to $\theta_1$ (=inclination angle $\theta_1$), and the composite fiber bundles 10 to which the matrix resin M is applied are wound around the mandrel 34 in a helical manner by reciprocating the resin application device 32 at a moving speed corresponding to the winding angle $\theta_1$.

Here, similarly to the inclination angle, when a positive or negative sign is assigned to the winding angle to distinguish the direction of an angle with respect to the mandrel 34, the composite fiber bundles 10 are wound around the mandrel 34 at a winding angle $+\theta_1$ during forward movement of the resin application device 32, and are wound around the mandrel 34 at a winding angle $-\theta_1$ during backward movement of the resin application device 32. By repeating the reciprocating movement a plurality of times, the composite fiber bundles 10 are wound around the mandrel 34 without any gaps at the winding angle $+\theta_1$ in the axis direction of the mandrel 34, and are wound around the mandrel 34 without any gaps at the winding angle $-\theta_1$ in the axis direction of the mandrel 34, and thus a helical unit layer is formed. The resin application device 32 is reciprocated by the number of times corresponding to the thickness D1 of the helical layer 6 (the number of layers of the helical unit layer), and the helical winding is completed.

Following the helical winding, hoop winding is performed. The winding angle is set to $\theta_2$ (=inclination angle $\theta_2$), and the resin application device 32 is reciprocated at a moving speed corresponding to the winding angle $\theta_2$. By one forward movement of the resin application device 32, a hoop unit layer is formed in which the composite fiber bundles 10 are densely wound adjacent to each other without overlapping in the axis direction of the mandrel 34 at the winding angle $+\theta_2$. By the subsequent backward movement, a hoop unit layer in which the composite fiber bundles 10 are densely wound adjacent to each other without overlapping in the axis direction of the mandrel 34 at the winding angle $-\theta_2$ is formed to overlap an outer circumference of the hoop unit layer formed in the previous forward movement. In this manner, the resin application device 32 is reciprocated the number of times corresponding to the thickness D2 of the hoop layer 7 (the number of layers of the hoop unit layer), and the hoop winding is completed.

As described above, in the helical winding and the hoop winding, the composite fiber bundles 10 are wound around the mandrel 34 with a predetermined tension applied to the composite fiber bundles 10. In particular, in the helical winding, it is preferable to prevent deviation of the winding position, which causes loosening and unevenness of the winding of the composite fiber bundles 10, at both ends of a molding region when turning from the forward movement to the backward movement and from the backward movement to the forward movement. For this purpose, for example, it is also preferable to mount pin rings having a plurality of pins radially disposed at a predetermined pitch on both ends of a molding region of a mounting mandrel, and wind the composite fiber bundles 10 while causing the composite fiber bundles 10 to pass between the pins. In addition, it is also preferable to wind the composite fiber bundles 10 for several rotations in the vicinity of both ends of a molding region of the mandrel 34 in order to prevent the deviation. When performing the winding for preventing the deviation, in order to reduce a step between a winding portion for preventing the deviation and a winding portion in the molding region, it is also preferable to use, for example, 1K or 3K composite fiber bundles obtained by dividing 12K composite fiber bundles 10 into yarns to reduce the number of the composite fibers 11.

Note that, in this example, although the composite fiber bundles 10 are wound around the mandrel 34 without being spread, the composite fiber bundles 10 may be spread by, for example, a spreading roller and then wound around the mandrel 34. Further, during the forward movement and the backward movement, a part of the spread composite fiber bundles 10 may be wound to overlap the part of the composite fiber bundles 10 wound during the previous forward movement or backward movement.

After forming a molded article in which the composite fiber bundles 10 are wound on an outer circumferential surface of the mandrel 34 as described above, the mandrel 34 is removed in combination with the molded article from the filament winder 33. For example, the molded article is heated in combination with the removed mandrel 34, and the matrix resin M applied to the composite fiber bundles 10 is cured. The molded article in which the matrix resin M is cured is removed from the mandrel 34, and is cut in a desired width as necessary to obtain the rotary member 2.

Figure 13:
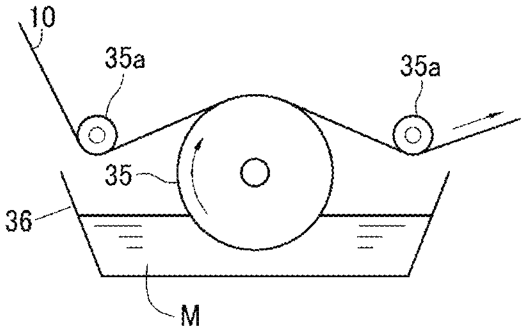
FIG. 13 is an explanatory diagram illustrating an example of a resin application device.

For example, as the resin application device 32, as illustrated in FIG. 13, a touch roll type resin application device is used. In the resin application device 32, a lower part of a touch roll 35 is immersed in the uncured liquid matrix resin M stored in a storage tank 36, and the composite fiber bundles 10 are pressed against an upper outer circumferential surface of the touch roll 35 by a pair of guide rollers 35*a*. When the touch roll 35 rotates, the stored liquid matrix resin M is applied to the composite fiber bundles 10 through an outer circumferential surface of the touch roll 35. The amount of application of the matrix resin M to the composite fiber bundles 10, that is, the carbon fibers 12 on which the structure 14 is formed is adjusted, and impregnation with the matrix resin M applied to the structure 14 becomes sufficient by adjusting a rotation speed of the touch roll 35, a pressing force of the composite fiber bundles 10 against the touch roll 35 by the pair of guide rollers 35*a*, and the like.

For example, by increasing or decreasing a rotational load of the guide roller 35*a* downstream of the touch roll 35, the tension of the composite fiber bundles 10 when being wound around the mandrel 34 is adjusted, and the guide roller 35*a* serves as a tension adjustment mechanism. The method for adjusting the tension of the composite fiber bundles 10 is not limited thereto, and for example, a mechanism for adjusting the tension may be provided separately.

It has been confirmed that the tensile strength of the rotary member 2 and a fiber volume content (Vf) of the carbon fibers 12 have a positive correlation, and it is preferable that the fiber volume content (Vf) of the carbon fibers 12 is higher from the viewpoint of increasing the tensile strength. The fiber volume content of the carbon fibers 12 may be, for example, 75% or more or less than 75%. On the other hand, as the fiber volume content increases, the amount of the matrix resin M serving as a binder in the rotary member 2 decreases, and the brittleness resistance of the rotary member 2 tends to decrease. Therefore, the fiber volume content is preferably set to less than 75% from the viewpoint of the brittleness resistance of the rotary member 2. In addition, the fiber volume content of the carbon fibers 12 is preferably 65% or more, and more preferably 67% or more from the viewpoint of securing sufficient tensile strength. From these viewpoints, as a preferred aspect, the fiber volume content of the rotary member 2 is set to 65% or more and less than 75%, and as a more preferred aspect, the fiber volume content in the rotary member 2 is set to 67% or more and less than 75%. Note that, the fiber volume content of the carbon fibers 12 in the rotary member 2 can be changed by adjusting, for example, the amount of application of the matrix resin M to the composite fiber bundles 10 by the resin application device 32, or the tension of the composite fiber bundles 10 when being wound around the mandrel 34.

The fiber volume content of the carbon fibers 12 in the rotary member 2 can be obtained by using Expression (1), for example. In Expression (1), a value p represents a specific gravity of the rotary member 2, a value pf represents a specific gravity of the carbon fibers 12, and a value $\rho_m$ represents a specific gravity of the matrix resin M. As the specific gravity $\rho$ of the rotary member 2 and the specific gravity $\rho_m$ of the matrix resin M, values measured by a measuring device (for example, a high-precision electronic gravimeter SD-200L (manufactured by Alfa Mirage Co., Ltd.)) are used. As the specific gravity $\rho_f$ of the carbon fibers 12, a value measured by a similar measuring device as in the rotary member 2 or the like may be used, or a catalog value (nominal value of a manufacturer of the carbon fibers 12) may be used. Note that, the specific gravity of each of the CNTs 17 and the sizing agent 15 adhered to the carbon fibers 12 is very small in comparison to the specific gravity of the carbon fibers 12, and thus the specific gravity of the carbon fibers 12 alone may be regarded as the specific gravity $\rho_f$.

[Expression 1]

$$V_f = \frac{\rho - \rho_m}{\rho_f - \rho_m} \tag{1}$$

Figure 14:
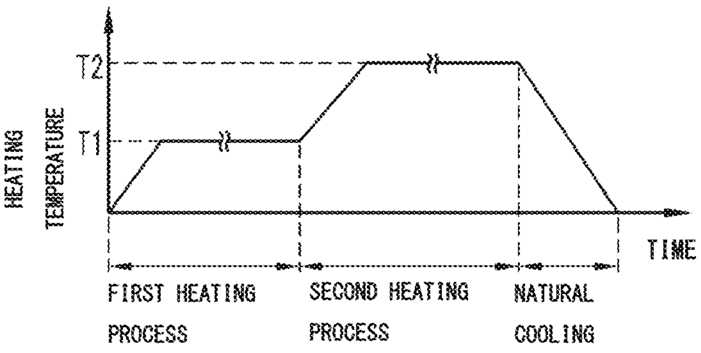
FIG. 14 is a graph showing an example in which a heating temperature is changed step by step when curing a matrix resin.

In the molding process ST3, when curing the matrix resin M, which is a thermosetting resin of the molded article manufactured by winding the composite fiber bundles 10 around the mandrel 34, it is also preferable to change a heating temperature step by step in order to improve the accuracy of an inner diameter dimension of the rotary member 2. In an example illustrated in FIG. 14, the temperature is changed in two stages in a curing process of curing the matrix resin M of the molded article. The temperature is raised from room temperature to a first heating temperature T1 and the first heating temperature T1 is maintained for a predetermined time, and thereafter, the temperature is raised to a second heating temperature T2 higher than the first heating temperature T1 and the second heating temperature T2 is maintained for a predetermined time. After maintaining the second heating temperature T2 for the predetermined time, the molded article is naturally cooled down, and then the molded article is removed from the mandrel 34 to obtain the rotary member 2.

A first heating process of heating the molded article at the first heating temperature T1 is a process of causing gelation of the matrix resin M to progress for mainly curing the molded article up to a stable shape with less size variation in a state of suppressing thermal expansion or thermal shrinkage of the mandrel 34 due to heating so as to decrease an error in the inner diameter dimension of the rotary member 2 to be manufactured. Therefore, the first heating temperature T1 is set to a temperature at which the thermal expansion of the mandrel 34 is suppressed to be small. In addition, heating at the first heating temperature T1 is performed until a stable shape of the molded article is obtained, that is, to a certain extent in which it can be said that curing is accomplished even though final strength is not obtained.

More specifically, the time for which the temperature is maintained at the first heating temperature T1 can be determined, for example, as the time until a storage elastic modulus of the matrix resin M becomes approximately constant. Note that, in the first heating process, it is preferable to suppress the thermal expansion or the thermal shrinkage of the molded article in order to further reduce the error in the inner diameter dimension of the rotary member 2. In this case, the first heating temperature T1 is a temperature at which the thermal expansion or the thermal shrinkage of the mandrel 34 is suppressed to be small, and is set to a temperature equal to or lower than a glass transition point of the matrix resin M (a constant temperature equal to or lower than the glass transition point of the matrix resin M which increases during the first heating process) at the time of termination of the first heating process so as to suppress the thermal expansion or the thermal shrinkage of the molded article. This also applies to this example.

The time for which the first heating temperature T1 is maintained may be the time until a variation rate (increase rate) of the storage elastic modulus of the matrix resin M turns to a decrease, the time until a loss elastic modulus reaches a peak or peaks out, or the like. Note that, for example, a variation in the storage elastic modulus and the loss elastic modulus of the matrix resin M with respect to the heating time for every heating temperature can be known by using a rheometer, and the time for which the first heating temperature T1 is maintained can be determined in advance. In addition, the glass transition point of the matrix resin M can be known in advance.

In a second heating process of heating the molded article at the second heating temperature T2, the molded article is heated at the second heating temperature T2 higher than the first heating temperature T1 in order to cause curing of the matrix resin M that has undergone the first heating process to progress, thereby obtaining final strength, elastic modulus, and heat resistance of the rotary member 2. The second heating temperature T2 in the second heating process is preferably higher the glass transition point of the matrix resin M. In a case where the matrix resin M is a cyanate ester resin, for example, the first heating temperature T1 is preferably within a range of 100° C. to 200° C., and the second heating temperature T2 is preferably within a range of 200° C. to 300° C.

When the heating temperature is changed step by step as described above, in the first heating process, the molded article is heated at the first heating temperature T1 in the first heating step, whereby the matrix resin M is cured and a stable shape of the molded article is formed. In the subsequent second heating process, curing of the matrix resin M of the molded article progresses, and the molded article has final strength, elastic modulus, and heat resistance. The inner diameter dimension of the rotary member 2 manufactured as described above is approximately determined at a point of time at which the stable shape of the molded article is formed in the first heating process, and since heating is performed at the first heating temperature T1 in the first heating process, the thermal expansion of the mandrel 34 and the thermal expansion or the thermal shrinkage of the matrix resin M are small. According to this, a molded article, that is, the rotary member 2 with a small error in the inner diameter dimension is obtained.

Note that, when the molded article is heated at the second heating temperature T2 in the second heating process, the thermal expansion of the mandrel 34 is larger in comparison to the first heating process, and the molded article having a stable shape is deformed due to the thermal expansion, but the majority of the deformation is an elastic deformation and thus the deformation returns to the original state after cooling. Therefore, in the second heating process, an influence by the inner diameter dimension of the molded article is significantly small.

When preparing 50 pieces of sample A of the rotary members 2 by changing the heating temperature step by step and by actually using a carbon steel material S45C for machine structural use as a material of the mandrel 34, the inner diameter dimension was 40 mm±0.003 mm. In contrast, when preparing 50 pieces of sample B of the rotary members 2 by raising the temperature from room temperature to the second heating temperature T2 in combination with the mandrel 34 manufactured by the same material, the inner diameter dimension was 40 mm+0.01 mm or more.

Note that, in the case of sample A, the temperature was raised from the room temperature and the first heating temperature T1 was maintained for 90 minutes, and then the temperature was raised from the first heating temperature T1 and the second heating temperature T2 was maintained for 120 minutes. In the case of sample B, the temperature was raised from the room temperature to the second heating temperature T2, and the second heating temperature T2 was maintained for 210 minutes. The first heating temperature T1 for the sample A was 145° C., and the second heating temperature T2 for the samples A and B was 200° C.

It can be seen that when curing the matrix resin M of the molded article by changing the heating temperature step by step as described above, control of the inner diameter dimension of the rotary member 2 to be manufactured becomes easy, and thus it is possible to manufacture the rotary member 2 in which an error in a desired inner diameter dimension is suppressed.

Note that, the heating temperature in the first heating process may be changed step by step in two or more steps, and heating may be performed for a predetermined time at each heating temperature. Even when the heating temperature in the first heating process is changed in two or more stages as described above, the second heating temperature T2 in the second heating process, that is, the final heating temperature is preferably a temperature exceeding the glass transition point of the matrix resin M.

Figure 15:
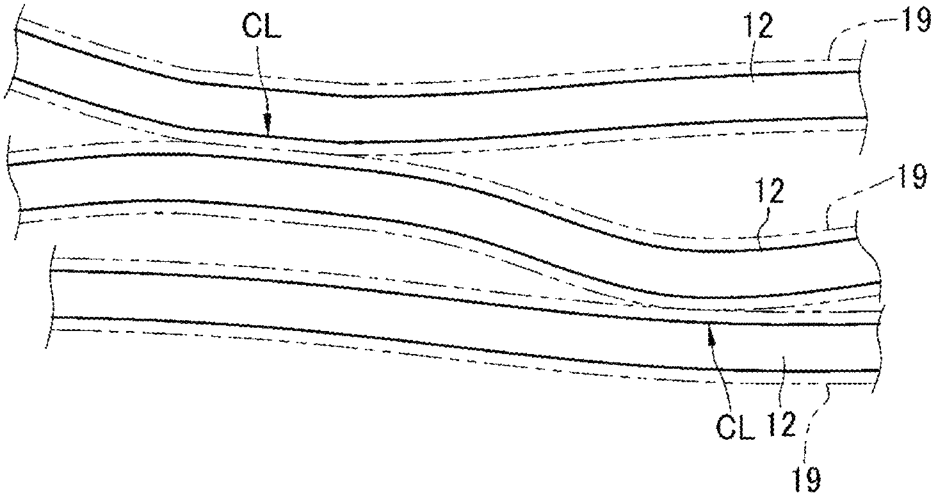
FIG. 15 is an explanatory diagram illustrating a state in which carbon fibers are cross-linked to each other.

In the rotary member 2 using the above-described composite fiber bundles 10, as schematically illustrated in FIG. 15, due to a cross-linking portion CL in which parts of the composite region 19 between the carbon fibers 12 are fixed to each other, a cross-linking structure in which the carbon fibers 12 are cross-linked is provided. As described above, the composite region 19 is a region formed from the structure 14 and the matrix resin M that is impregnated into the structure 14 and is cured. The composite region 19 has higher hardness in comparison to a cured matrix resin alone, and has high elasticity, that is, a large elastic limit. In addition, the composite region 19 has higher wear resistance in comparison to the matrix resin M. Due to mutual bonding of a plurality of the composite regions 19, bonding between the carbon fibers 12 becomes strong, and the tensile strength of the rotary member 2 using the composite fiber bundles 10 is improved.

Since the cross-linking structure is formed in a case where a distance between the carbon fibers 12 is short to a certain extent in which a plurality of the structures 14 come into contact with each other, the larger the thickness of the structure 14 is, the more advantageous it is for increasing the number of cross-links. However, the thickness of the structure 14 is preferably set to at most 300 nm or less from the viewpoint of securing quality stability by a uniform thickness, the viewpoint of preventing detachment from the carbon fibers 12, and the like. Particularly, the thickness of the structure 14 may be set within a range of 50 nm to 200 nm.

In addition, in the structure 14, since a plurality of CNTs 17 are entangled with each other in a non-woven fabric shape with a certain thickness, the matrix resin M applied to the carbon fibers 12 is maintained in a state of being impregnated into the structure 14. Accordingly, in a carbon fiber-reinforced molded article such as the rotary member 2, the matrix resin M substantially does not deviate on the surfaces of the carbon fibers 12 regardless of a molding method thereof, and an interval between the carbon fibers becomes uniform. Therefore, a load is uniformly transferred between the carbon fibers through a shear force of the matrix resin M, and thus tensile strength of the rotary member 2 effectively increases.

Figure 16:
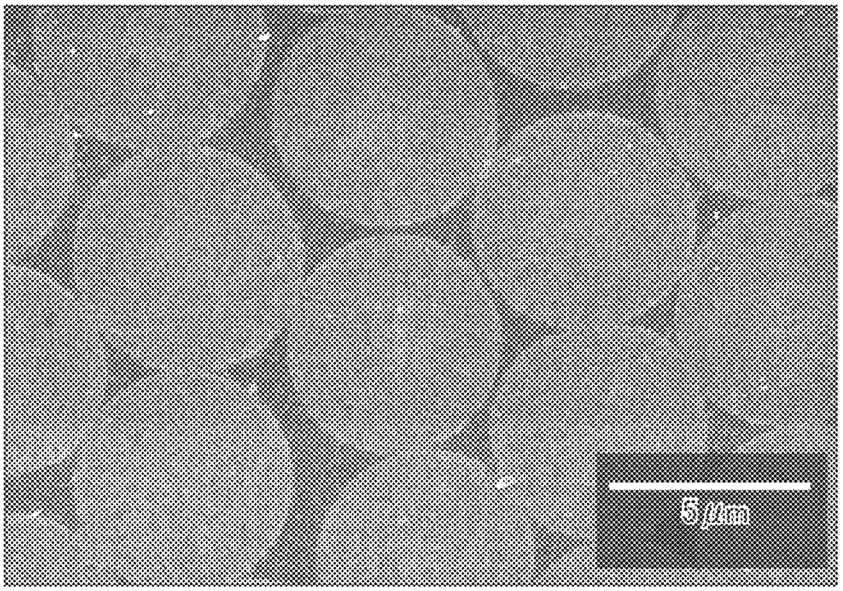
FIG. 16 is an SEM photograph of a cross section of a rotary member showing a state of composite fibers in the rotary member.
Figure 17:
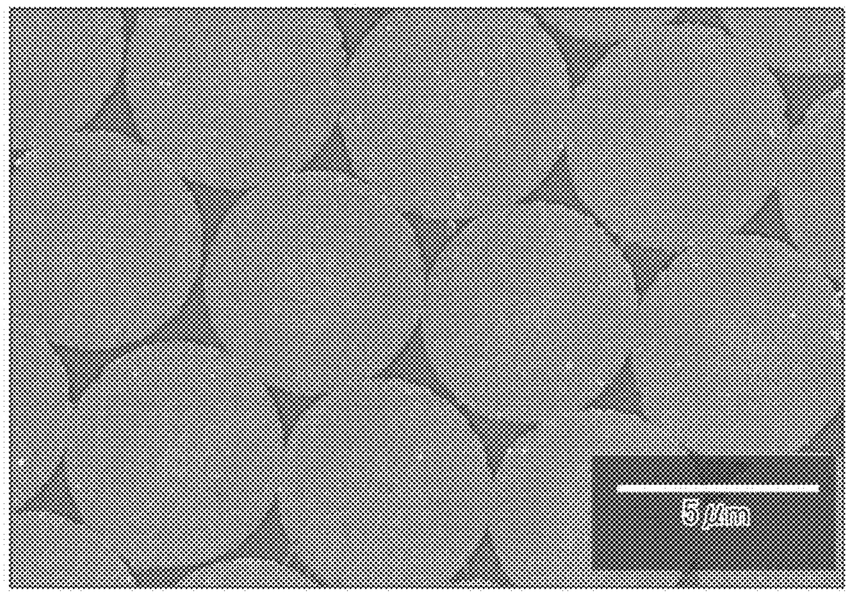
FIG. 17 is an SEM photograph of a cross section of a rotary member showing a state of carbon fibers in the rotary member using raw fibers of the carbon fibers.

FIG. 16 shows an SEM photograph of a cross section of the rotary member 2 manufactured using the composite fiber bundles 10. FIG. 17 shows an SEM photograph of a cross section of a rotary member similarly manufactured using a carbon fiber bundle formed of carbon fibers (raw fibers) to which CNTs do not adhere. In each of the cross sections, a closest packing site in which the carbon fibers were very densely packed was observed, and it was confirmed that the amount of a matrix resin absorbing the deformation of the rotary member was small.

In the rotary member using the carbon fibers (raw fibers) to which CNTs do not adhere, a clear boundary line was observed at an interface between the carbon fibers and the matrix resin. In addition, at the closest packing site, adjacent carbon fibers are in contact with each other, or a very thin matrix resin is interposed between the adjacent carbon fibers. Accordingly, bonding strength of two adjacent carbon fibers does not exceed adhesion strength at the interface between the carbon fibers and the matrix resin. In addition, it can be seen that the matrix resin decreases with an increase in the fiber volume content (Vf) and the rotary member tends to become weaker.

In contrast, in the rotary member 2 using the composite fiber bundles 10, it can be confirmed that the composite region 19 in which the structure 14 is impregnated with the matrix resin M and the matrix resin M is cured is formed at the periphery of the carbon fibers 12. By such a composite region 19, it can be seen that the interface adhesion strength between the carbon fibers 12 and the matrix resin M is further raised, and the tensile strength of the rotary member 2 becomes higher. In addition, it can be seen that in the closest packing site, the above-described cross-linking structure is formed, which strengthens the interaction between the carbon fibers and improves the tensile strength.

Although an example of the rotary member used in a surface magnet type electric motor has been described above, the rotary member may be fitted around a rotor of another type of electric motor or generator. In addition, in the electric motor and generator, a structure in which another member is integrally formed or assembled on an inner circumference or an outer circumference of the rotary member having a cylindrical shape, a ring shape, or the like may be employed. Accordingly, in the electric motor and the generator, a carbon fiber-reinforced layer that becomes a rotary member may be formed as a part of a member including another member.

EXAMPLES

Example 1

Figure 18:
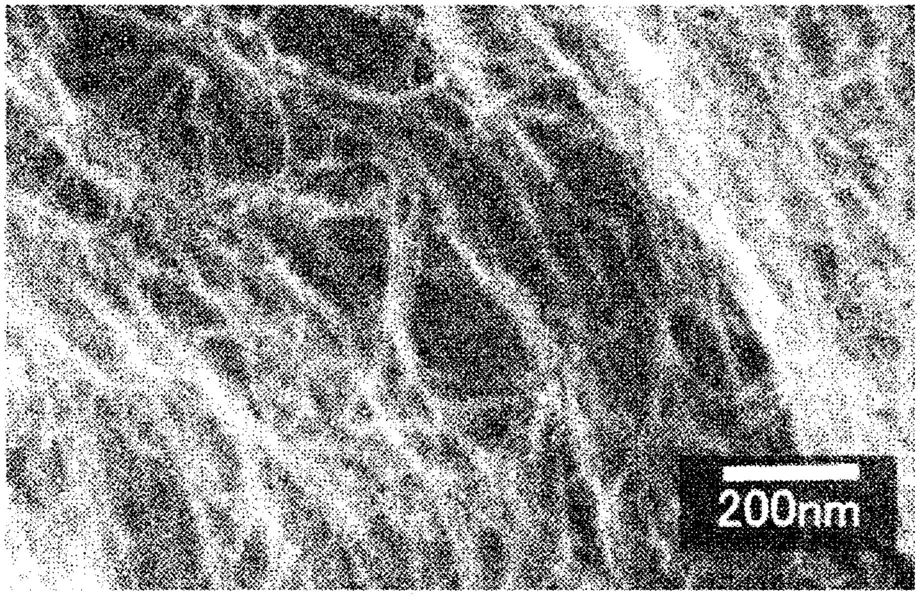
FIG. 18 is an SEM photograph showing a bent state of a material CNT used in Example.

In Example 1, the composite fiber bundle 10 was manufactured by the above-described procedure, a peeling test of the CNTs 17 was performed, and the effect of the sizing agent 15 was confirmed. The dispersion 28 used when manufacturing the composite fiber bundle 10 was prepared by the material CNT having the bent shape as described above. A SEM photograph of the material CNT used in preparation of the dispersion 28 is shown in FIG. 18. The material CNT was formed in a multi-layer structure, and a diameter was within a range of 3 nm to 10 nm. The material CNT was cleaned with 3:1 mixed acid of sulfuric acid and nitric acid to remove a catalytic residue, and was filtered and dried. The material CNT was added to acetone as the dispersion medium of the dispersion 28, and the material CNT was cut by using an ultrasonic homogenizer to obtain the CNTs 17. A length of the CNTs 17 in the dispersion 28 was 0.2 μm to 5 μm. In addition, the CNTs 17 in the dispersion 28 could be evaluated as having the bent shape. A concentration of the CNTs 17 in the dispersion 28 was set to 0.12 wt % (=1200 wt ppm). A dispersing agent and an adhesive were not added to the dispersion 28.

As the carbon fiber bundle 18 used in manufacturing the composite fiber bundle 10, TORAYCA (registered trademark) T1100SC (manufactured by TORAY INDUSTRIES, INC.) was used. The carbon fiber bundle 18 includes 12000 carbon fibers 12. A diameter of the carbon fibers 12 is approximately 7 μm, and a length thereof is approximately 500 m. Note that, in the carbon fiber bundle 18, the sizing agent for preventing entanglement of the carbon fibers 12 was removed from the surfaces of the carbon fibers 12 before adhesion of the CNTs 17.

In a state of being spread, the carbon fiber bundle 18 was wound around the guide rollers 23 to 26 and was traveled in the dispersion 28 contained in the CNT adhesion tank 22. A traveling speed of the carbon fiber bundle 18 was set to 1 m/minute, and ultrasonic vibration having a frequency of 200 kHz was applied to the dispersion 28 with the ultrasonic wave generator 27. Note that, immersion time for which the carbon fiber bundle 18 travels between the guide rollers 24 and 25 was set to 6.25 seconds. The immersion time corresponds to 1250000 cycles of the ultrasonic vibration applied to the dispersion 28.

After the carbon fiber bundle 18 pulled out from the dispersion 28 was dried, the sizing treatment was performed to apply the sizing agent 15 to the CNTs 17 constituting the structure 14. In the sizing treatment, a sizing treatment solution obtained by dissolving "Carbodilite V-02" (trade name, manufactured by Nisshinbo Chemical Inc.) as a carbodiimide compound in water was used. A concentration of the carbodiimide compound in the sizing treatment solution was adjusted so as not to block the gap 20 of the structure 14. The carbon fiber bundle 18 that has undergone the sizing treatment was dried to obtain the composite fiber bundle 10.

With respect to a plurality of composite fibers 11 obtained by cutting out a part of the composite fiber bundle 10 that has undergone the sizing treatment as described above, it was observed that a plurality of CNTs 17 uniformly disperse and adhere to the carbon fibers 12 with an SEM. As a result, it was confirmed that the CNTs 17 were uniformly adhered in a narrow range (locally) and a wide range in a fiber axis direction of the carbon fibers 12, and thus the structure 14 was formed. In addition, it was confirmed that the structure 14 was formed in a non-woven fabric shape having a three-dimensional mesh structure constituted by a plurality of the CNTs 17, that is, the gap 20, and the majority of the gap 20 was not filled up by the sizing agent 15.

The composite fiber bundle 10 manufactured as described above was set as a reinforcement fiber, and a plurality of ring-shaped test pieces A1 were manufactured as rotary members 2 different in a fiber volume content (Vf) of carbon fibers 12, and tensile strength of each of the test pieces A1 was measured by an NOL ring test (conforming to ASTM D2290). In addition, as Comparative Example 1, a raw fiber (carbon fiber) was set as a reinforcement fiber, and a plurality of ring-shaped test pieces B1 different in the fiber volume content (Vf) of carbon fibers were manufactured, and tensile strength of each of the test pieces B1 was measured in a similar manner. The carbon fiber bundle used in Comparative Example 1 was the same as that in Example 1.

In the ring-shaped test pieces A1 and B1, the inclination angle $\theta_1$ of the helical layer was set to 40°, and the inclination angle $\theta_2$ of the hoop layer was set to substantially 90° (substantially orthogonal). A thickness of each of the ring-shaped test pieces A1 and B1 was set to 1.83 mm, and the ratio of the thickness D1 of the helical layer to the thickness D2 of the hoop layer was set to 5.1 (=D2/D1). That is, the thickness D1 of the helical layer was set to 0.3 mm, and the thickness D2 of the hoop layer was set to 1.53 mm. In the NOL ring test in Example 1 and Comparative Example 1, a 5582 type universal material test machine (manufactured by Instron Corp.) was used, and the test was performed at a tensile speed of 2 mm/min.

Figure 19:
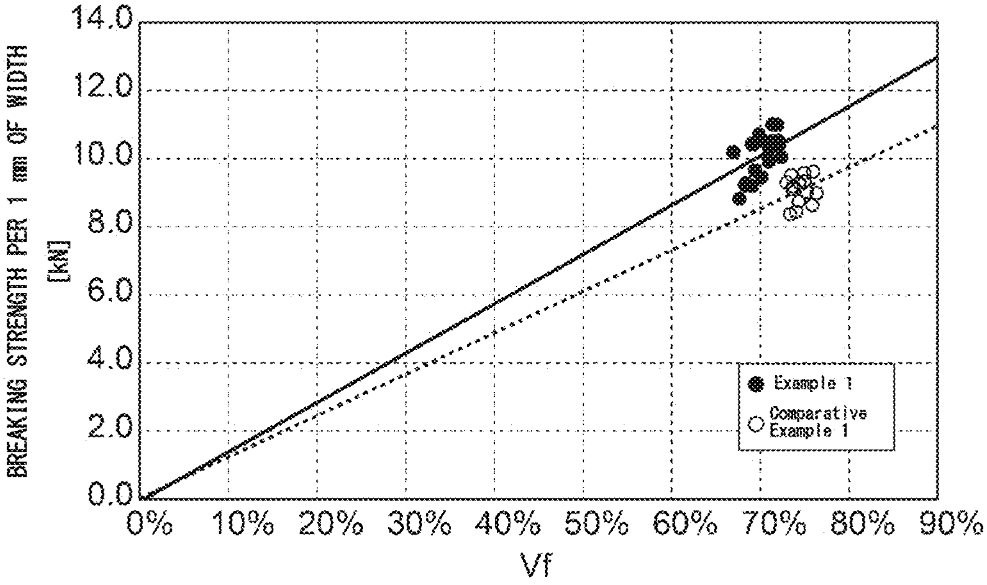
FIG. 19 is a graph showing NOL ring test results in Example 1 and Comparative Example 1.
Figure 20:
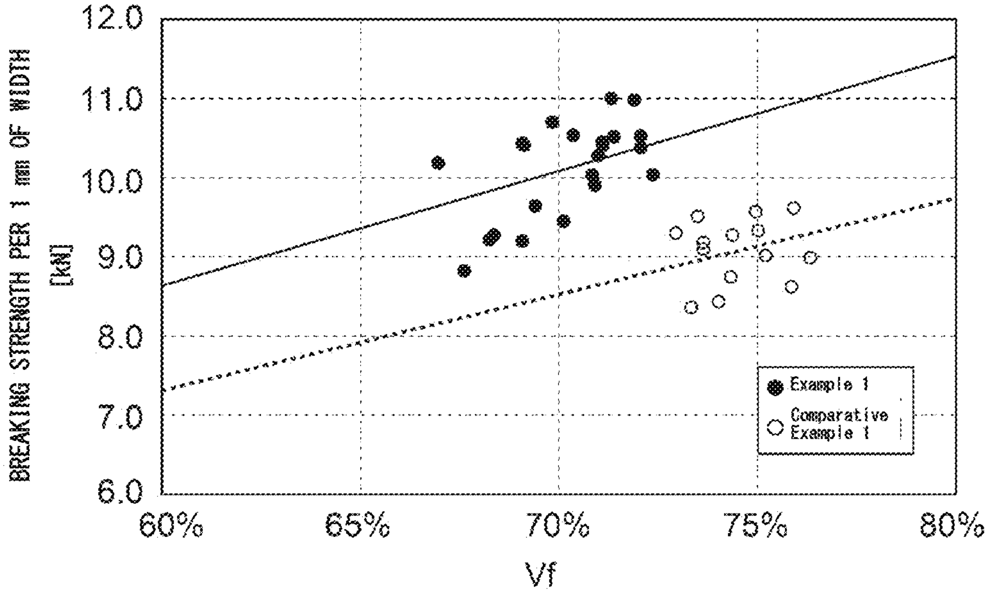
FIG. 20 is a graph showing a region in which a fiber volume content is 60% or more among the NOL ring test results in Example 1 and Comparative Example 1 in an enlarged manner.

The measurement results are shown in FIG. 19. In FIG. 19, ● represents a plot of respective measurement results in Example 1 (ring-shaped test piece A1), and ▲ represents a plot of respective measurement results in Comparative Example 1 (ring-shaped test piece B1). In addition, in FIG. 19, the horizontal axis represents the fiber volume content (Vf) of the carbon fibers in the ring-shaped test piece, and the vertical axis represents the breaking strength (=tensile strength) per 1 mm of a width of the ring-shaped test piece. A solid line is an approximate straight line representing a relationship between the fiber volume content and the breaking strength on the basis of the measurement values in Example 1, and a broken line is an approximate straight line representing a relationship between the fiber volume content and the breaking strength on the basis of the measurement values in Comparative Example 1. In FIG. 20, a region where the fiber volume content is in a range of 60% to 80% in FIG. 19 is shown in an enlarged manner.

From FIG. 19 and FIG. 20, it could be confirmed that the tensile strength is improved in proportion to the fiber volume content. In addition, it can be seen that the ring-shaped test piece A1 can obtain high tensile strength with a low fiber volume content in comparison to the ring-shaped test piece B1. That is, it can be seen that the rotary member 2 in which the composite fiber 11 is set as a reinforcement fiber has higher tensile strength in comparison to a rotary member in which a raw fiber of carbon fibers having the same fiber volume content is set as a reinforcement fiber.

From the results of Example 1, it can be seen that the rotary member 2 using the composite fiber 11 as a reinforcement fiber can obtain higher tensile strength than a rotary member using a raw fiber as a reinforcement fiber, and a rotary member 2 that combines high tensile strength and high brittleness resistance can be obtained. In addition, when the fiber volume content of the rotary member 2 manufactured by using the composite fiber 11 as reinforcement fiber is, for example, 65% or more and preferably 67% or more, it can be seen that the tensile strength thereof can be the same as or higher than the tensile strength of a rotary member in which a reinforcement fiber is used as a raw fiber and the fiber volume content is 75%, and sufficient tensile strength can be obtained.

REFERENCE SIGN LIST

2: Rotary member
3: Surface magnet type electric motor
4: Rotor
10: Composite fiber bundle
11: Composite fiber
12: Carbon fiber
14: Structure
15: Sizing agent
17: Carbon nanotube
M: Matrix resin

What is claimed is:

1. A rotary member, which is a carbon fiber-reinforced molded article in which a carbon fiber is embedded in a matrix resin, and which is rotatable integrally with a rotary body of an electric motor or a generator, the rotary member comprising:
- a helical layer in which a composite carbon fiber is oriented at an inclination angle in a range of 40° to 80° with respect to an axial direction of the rotary member; and
- a hoop layer in which the composite carbon fiber is oriented in a direction substantially orthogonal to the axial direction of the rotary member, wherein the composite carbon fiber includes
- a structure that is provided on a surface of the carbon fiber, includes a plurality of carbon nanotubes having a bent shape and including a bent portion, and forms a network structure including a contact portion in which the carbon nanotubes are in direct contact with each other, and
- a sizing agent that cross-links the carbon nanotubes in direct contact with each other.

2. The rotary member according to claim 1, wherein when a thickness of the helical layer is D1 and a thickness of the hoop layer is D2, a value D2/D1 is in a range of 5 to 20.

3. The rotary member according to claim 1, wherein a fiber volume content of the carbon fiber is 65% or more and less than 75%.

4. The rotary member according to claim 2, wherein a fiber volume content of the carbon fiber is 65% or more and less than 75%.

* * * * *